United States Patent [19]

Jennings

[11] Patent Number: 4,464,137

[45] Date of Patent: Aug. 7, 1984

[54] CLUTCH MECHANISM

[75] Inventor: Richard E. Jennings, New Holland, Pa.

[73] Assignee: Sperry Corporation, New Holland, Pa.

[21] Appl. No.: 452,001

[22] Filed: Dec. 21, 1982

[51] Int. Cl.³ .......................... F16D 7/02; F16D 3/14
[52] U.S. Cl. ........................................ 464/48; 464/30; 464/160
[58] Field of Search ................... 464/46, 48, 160, 30, 464/161

[56] References Cited

U.S. PATENT DOCUMENTS

| | | |
|---|---|---|
| 2,626,000 | 1/1953 | Yergens . |
| 2,755,900 | 7/1956 | Seyfried . |
| 2,940,283 | 6/1960 | Christenson et al. . |
| 3,064,455 | 11/1962 | Gros ............................. 464/46 X |
| 3,110,510 | 11/1963 | Berner . |
| 3,122,903 | 3/1964 | Ramsden . |
| 3,550,727 | 12/1970 | McCain ........................ 464/48 X |
| 3,756,042 | 9/1973 | Heth et al. . |

Primary Examiner—Stuart S. Levy
Assistant Examiner—Thomas R. Hannon
Attorney, Agent, or Firm—Larry W. Miller; Frank A. Seemar; Darrell F. Marquette

[57] ABSTRACT

A torque limiting power transfer mechanism for use on an apparatus connectable to a power takeoff shaft, such as pull-type agricultural equipment is disclosed wherein the drive shaft connectable to the power takeoff shaft is rotatably connected to the clutch mechanism. Stops affixed to the clutch mechanism limit the amount of rotational movement of the drive shaft relative to the clutch and provide a limited amount of rotational movement to facilitate a connection of the drive shaft to the power takeoff shaft, yet provide a positive driving connection between the drive shaft and the clutch mechanism.

14 Claims, 4 Drawing Figures

CLUTCH MECHANISM

BACKGROUND OF THE INVENTION

The present invention relates generally to a torque limiting power transfer mechanism for agricultural equipment and, more particularly, to a slip clutch with a swivel mechanism to facilitate the connection of the drive shaft of pull-type harvesting machines to the power takeoff shaft on the tractor providing the source of motive power.

It is well known that clutches provide a torque limiting capability for drive lines on harvesting machines to protect the various components under conditions where excessive amounts of power are required, such as when the harvesting machine has plugged with crop. In pull-type agricultural equipment, it is necessary to connect the power input shaft of the machine to the power takeoff shaft of the tractor. Since the power takeoff shaft usually has of a non-circular cross-sectional configuration, e.g., a splined or hexagonal shape, to provide a positive driving connection between the power takeoff shaft and the drive shaft, it will often be necessary to physically turn the drive shaft until it is aligned with the shape of the power takeoff shaft so that they can be connected.

Since the drive shaft is connected to the driven components of the pull-type agricultural machine, it becomes necessary to rotate these driven components when the drive shaft is turned to align it with the power takeoff shaft. Due primarily to the increasing sizes of harvesting machines, resulting in more massive driven components, it can be particularly difficult to align the drive shaft with the tractor's power takeoff and drivingly connect the harvesting machine to the tractor. Accordingly, it would be advantageous to provide a mechanism that would easily and conveniently permit the drive shaft of a pull-type agricultural harvesters to be aligned with the power takeoff shaft of the tractor providing the source of motive power.

SUMMARY OF THE INVENTION

It is an object of this invention to overcome the aforementioned disadvantages of the prior art by providing a clutch mechanism having the power input shaft thereto connected by a swivel.

It is another object of this invention to rotatably connect the power input shaft to a clutch mechanism such that the power input shaft can be rotated relative thereto.

It is another object of this invention to provide stops affixed to the clutch mechanism to limit the amount of rotational movement of the power input shaft relative to the clutch mechanism and provide a positive driving connection therebetween.

It is still another object of this invention to provide a clutch mechanism having a power transfer shaft connected thereto for limited rotative movement relative to the clutch mechanism.

It is a feature of this invention that the drive shaft of a pull-type agricultural harvesting machine can be turned for alignment with the power takeoff shaft of a tractor without moving the driven components of the agricultural harvesting machine.

It is an advantage of this invention that the connection of a pull-type agricultural machine to a tractor can be facilitated.

It is yet another object of this invention to provide outwardly projecting drive lugs on the power input shaft to a clutch mechanism that are engageable with stops affixed to the clutch mechanism to provide a positive driving relationship therebetween.

It is a further object of this invention to provide an easily and conveniently operated mechanism to facilitate the connection of a pull-type agricultural machine to its source of motive power.

It is still a further object of this invention to provide a torque limiting power transfer mechanism having a power input shaft rotatably affixed thereto which is durable in construction, inexpensive of manufacture, carefree of maintenance, facile in assemblage and simple and effective in use.

These and other objects, features and advantages are accomplished according to the instant invention by providing a torque limiting power transfer mechanism for use on an apparatus connectable to a power takeoff shaft, such as pull-type agricultural equipment, wherein the drive shaft connectable to the power takeoff shaft is rotatably connected to the clutch mechanism. Stops affixed to the clutch mechanism limit the amount of rotational movement of the drive shaft relative to the clutch and provide a limited amount of rotational movement to facilitate a connection of the drive shaft to the power takeoff shaft, yet provide a positive driving connection between the drive shaft and the clutch mechanism.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
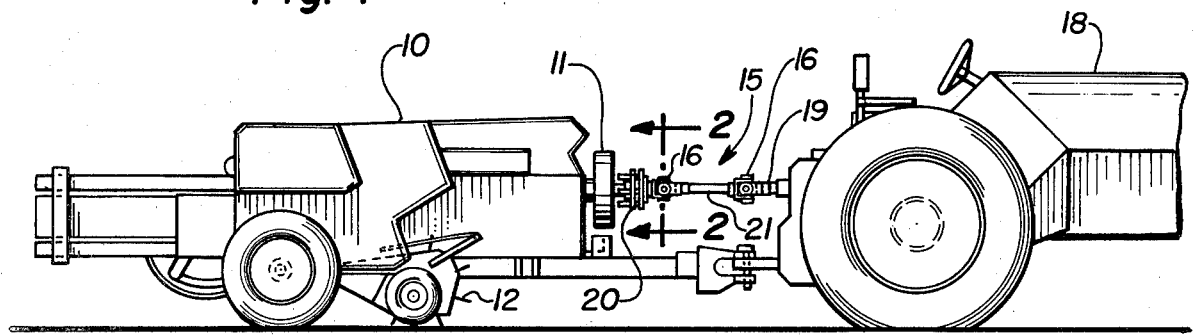
FIG. 1 is a side elevational view of a pull-type agricultural machine, commonly referred to as a baler, connected to a tractor serving as the source of motive power, incorporating the principals of the instant invention.

Referring now to the drawings and, particularly to FIG. 1, a side elevational view of a pull-type agricultural machine can be seen. Although FIG. 1 depicts a pull-type square baler as a representative agricultural machine, the instant invention is not limited for use in conjunction with a baler. As one skilled in the art will readily realize, the instant invention will be equally applicable to other pull-type machinery, such as mower-conditioners, manure spreaders, round balers and forage harvesters.

The pull-type agricultural harvesting machine, such as the baler 10, generally includes rotatably driven components, such as the flywheel 11, the pickup mechanism 12, a plunger (not shown), etc. The rotational driving power for these driven components is generally provided through a drive line 15 that is connectable to the power takeoff shaft 19 of the tractor 18, serving as the source of motive power for the pull-type baler 10. To accommodate for any misalignment between the drive line 15 and the power takeoff shaft 19, the drive line 15 is usually provided with one or more universal joints 16. Generally a clutch 20 is also provided within the drive line 15 to provide torque limiting capabilities in the event an excessive amount of power is required to drive the aforementioned driven components, such as would result if one or more of the driven components became jammed. The drive line 15 further includes a power input shaft 22 that is connectable to the power takeoff shaft 19 of the tractor 18 and is operable to transfer rotational power to the clutch mechanism 20.

Figure 2:
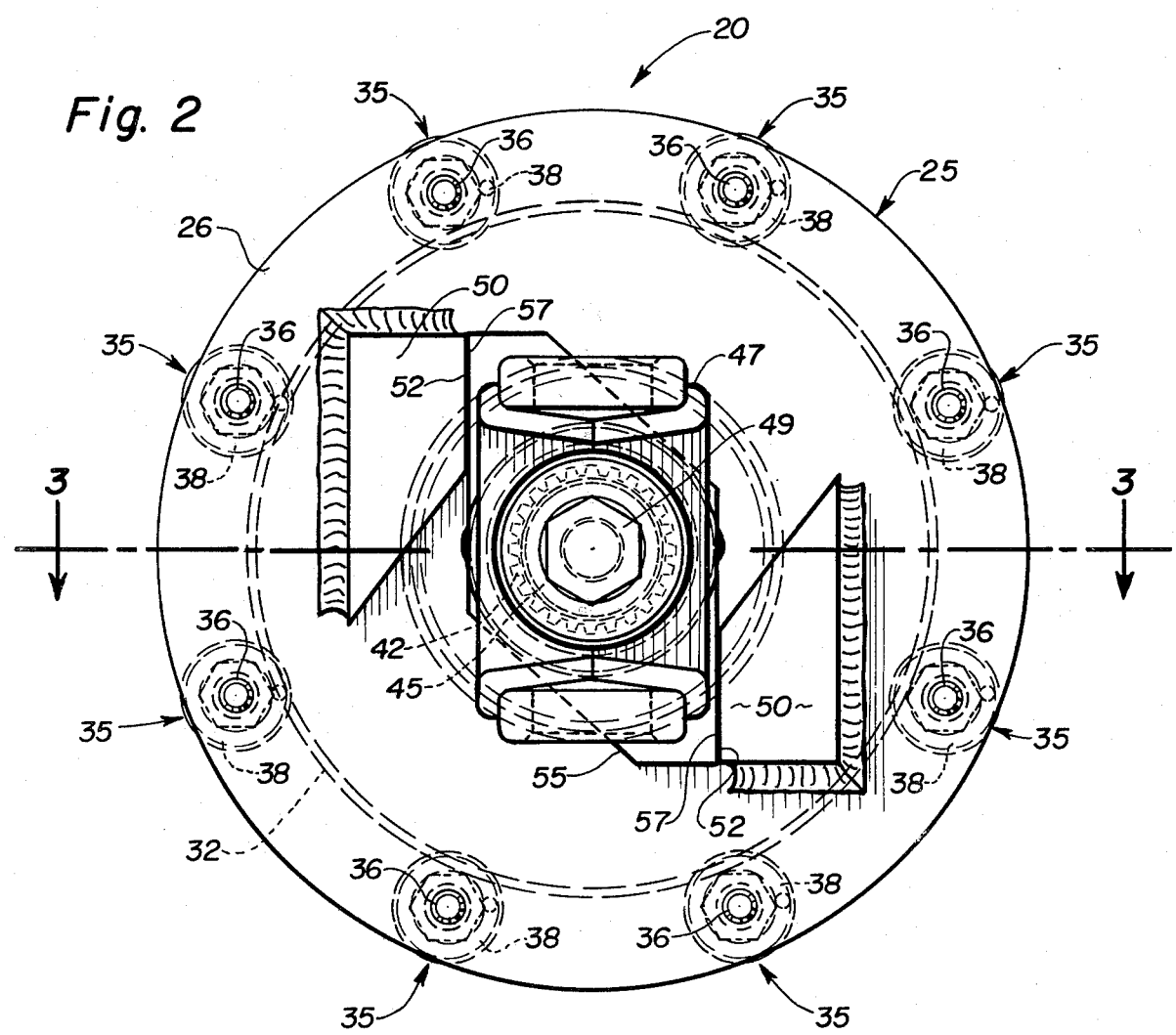
FIG. 2 is a cross-sectional view taken through the power input shaft along lines 2—2 of FIG. 1 and showing the clutch mechanism having the power input shaft swivelly connected thereto.
Figure 3:
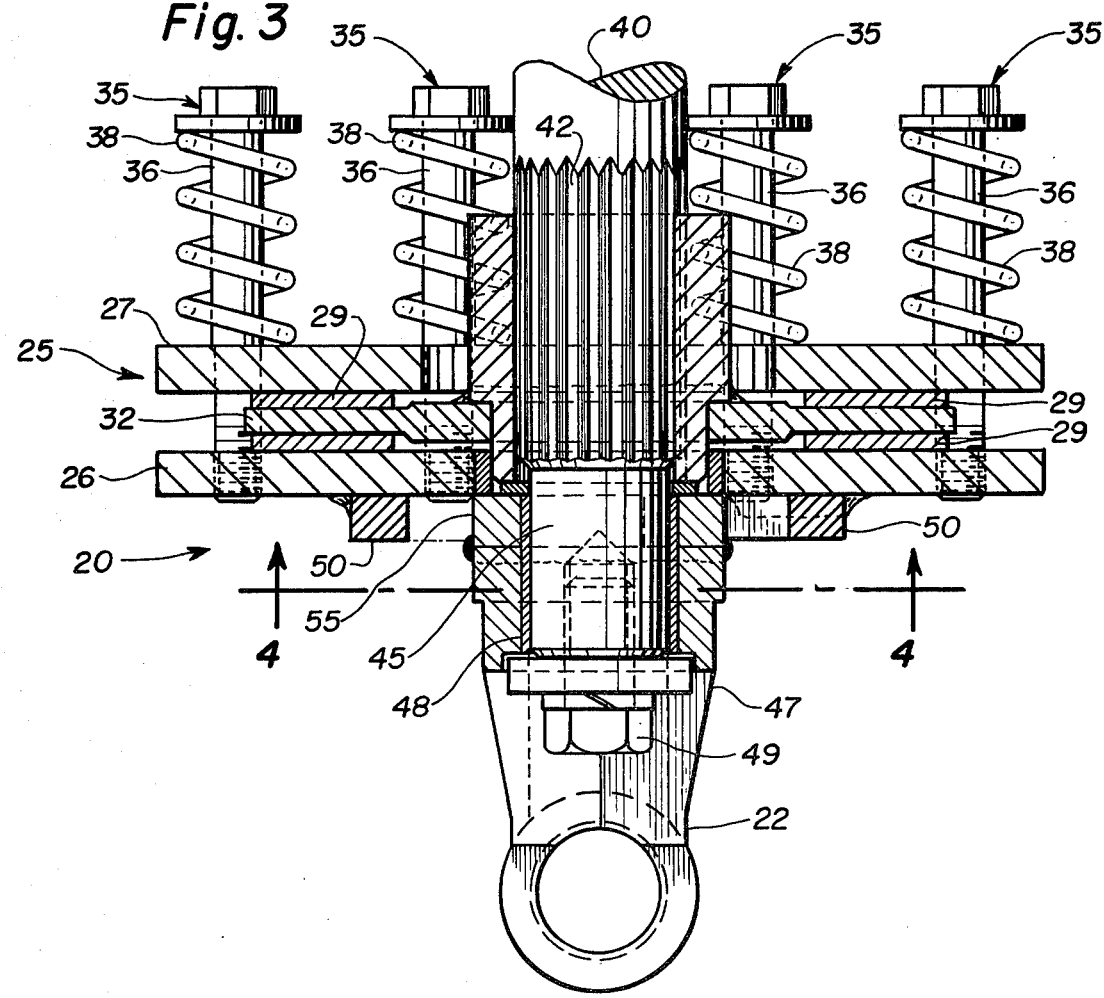
FIG. 3 is a cross-sectional view taken along lines 3—3 of FIG. 2 to show further details of the clutch mechanism.
Figure 4:
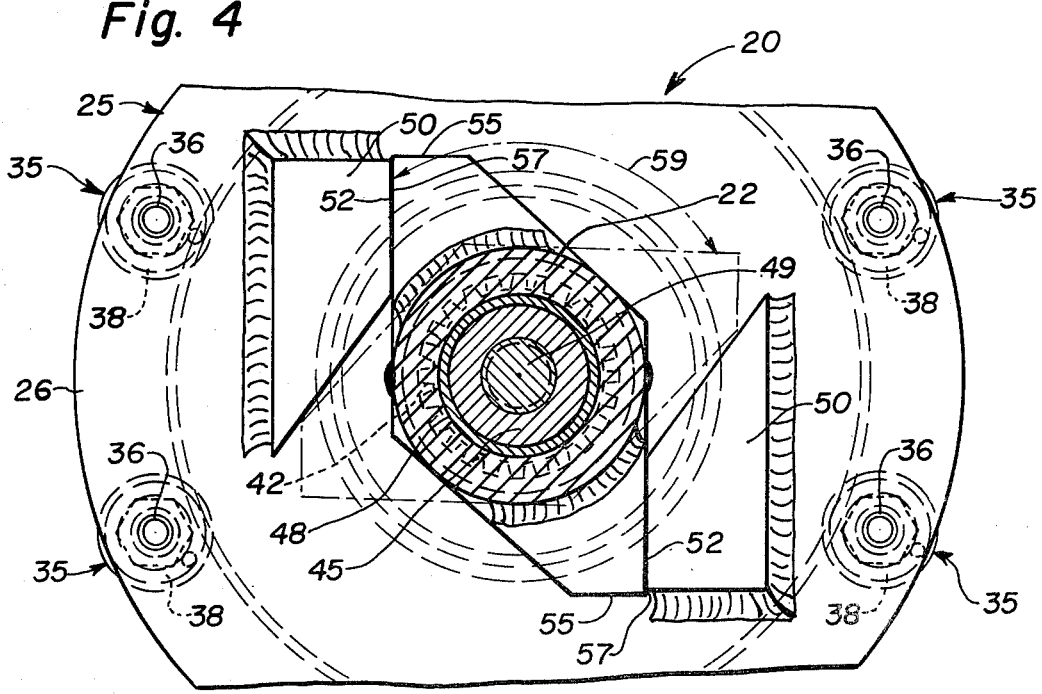
FIG. 4 is a cross-sectional view taken along lines 4—4 of FIG. 3, to show the stops limiting the amount of rotational movement of the power input shaft relative to the clutch in greater detail, the maximum extent of rotational movement of the power input shaft being seen by the tabs shown in phantom.

Referring now to FIGS. 2, 3 and 4, the details of the instant invention can be seen. Although the instant invention is also applicable to other types of clutch mechanisms, a slip clutch is depicted in FIGS. 2–4. The slip clutch 20 includes a driving member 25 having first and second spaced apart plates 26,27, a driven member 32, and a biasing mechanism 35 for urging the driving member 25 and the driven member 32 into operative driving engagement. Generally the first and second drive plates 26,27 are provided with frictional pads 29 to more aggressively engage the driven member 32 and provide a more positive driving engagement between the driving member 25 and the driven member 32.

The biasing mechanism 35 includes a number of bolts 36 threaded into and circumferentially spaced around the first drive plate 26 and slidably received through the second drive plate 27. A spring 38 is concentrically mounted on each bolt 36 and arranged to yieldably bias the second drive plate 27 toward the first drive plate 26. Since the driven member 32 is positioned between the first and second drive plates 26,27 the frictional pads 29 operatively engage the driven member 32 to effect rotation thereof with the driving member 25. The predetermined amount of force applied by the springs 38 provides the torque limiting properties of the clutch 20 as the driving member 25 and the driven member 32 are free to rotate relative to one another if the power requirements of the aforementioned driven components exceeds that permitted by the force of the springs 38.

As is best seen in FIG. 3, the power output shaft 40 transfers rotational power from the clutch mechanism 20 to the driven components in the agricultural machine 10. The power output shaft 40 includes a splined portion 42, onto which the driven member 32 is fixed to effect the rotation thereof, and a collar portion 45 projecting beyond the driving member 25, which is rotatably supported on the power output shaft 40 for rotation relative thereto.

The power input shaft 22 is rotatably mounted on the power output shaft 40 so as to permit rotation of the power input shaft 22 relative to both the power output shaft 40 and the driving member 25. Since the power input shaft 22 normally includes at least one universal joint 16, it is preferable that the yoke 47 of the universal joint 16 be directly connected to the collar portion 45 of the power output shaft 40. This preferred arrangement of parts provides an easy and convenient way to manufacture and assemble the instant invention. A bushing 48 permits the yoke 47 to be rotatably mounted on the collar portion 45. A cap screw and washer assembly 49 which is threaded into the end of the collar portion 45 retains the yoke 47 in its mounted position on the power output shaft 40.

To limit the rotational movement of the power input shaft 22, i.e., the rotation of the yoke 47, relative to the driving member 25 of the clutch 20, stops 50 are welded to the first drive plate 26. A pair of drive lugs 55 are welded to the yoke 47, so as to be rotatable therewith, and project radially outwardly to be engageable with the stops 50. The stops 50 are positioned on the first drive plate 26 to present an engagement edge 52 to match a corresponding engagement edge 57 on the lugs 55 to provide a positive driving connection between the power input shaft 22 and the driving member 25 of the clutch 20. The stops 50 are diametrically spaced relative to the power input shaft 22 to provide a limited amount of rotational movement of the yoke 47 relative to the driving member 25, as shown in phantom and indicated by the arcuate line 59 in FIG. 4.

It can now be seen that the instant invention can facilitate the connection of the drive line 15 of the agricultural machine 10 to the power takeoff shaft 19 of the tractor 18. Because the power input shaft 22 can be swiveled relative to the driving member 25 of the clutch 20, as indicated by the arcuate line 59, the power input shaft 22 can be rotated a sufficient amount to align the corresponding shapes of the input shaft 22 and the power takeoff shaft 19 for connection therebetween. Since the power input shaft 22 is free to rotate relative to the clutch 20, the rotation of the input shaft 22 does not require any movement of the driven components of the agricultural machine 10.

Once the drive line 15 has been connected to the power takeoff shaft 19, the powered rotation of the power input shaft 22 causes the drive lugs 55 to drivingly engage the stops 50 and, thereby, effect rotation of the driving member 25. The frictional engagement between the driving member 25 and the driven member 32 causes the rotation of the driven member 32 and a corresponding rotation of the power output shaft 40 to drive the respective driven components in the agricultural machine 10.

It will be understood that changes in the details, materials, steps and arrangement of parts which have been described and illustrated to explain the nature of the invention, will occur to and may be made by those skilled in the art upon a reading of the disclosure within the principles and scope of the invention.

The foregoing description illustrates preferred embodiments of the invention. However, concepts, as based upon such a description, may be employed in other embodiments without departing from the scope of the invention. Accordingly, the following claims are intended to protect the invention broadly, as well as in the specific form shown herein.

Having thus described the invention, what is claimed is:

1. A torque limiting power transfer assembly comprising:
 a clutch mechanism having a driving member, a driven member operatively engageable with said driving member, and a biasing means for urging said driving member and said driven member into engagement for the transfer of rotational power therebetween, said biasing means permitting said driving and driven members to become operatively disengaged so that power is not transferred therebetween when the power to be transferred exceeds a predetermined amount;

a first rotatable power transfer shaft operatively associated with said driving member, said first shaft being rotatable relative to said driving member;

limit means connected to said driving member to limit the rotational movement of said first shaft relative to said driving member and provide a driving connection between said first shaft and said driving member; and a second rotatable power transfer shaft connected to said driven member for rotation therewith, said second shaft including a collar portion projecting beyond said clutch mechanism, said first shaft being mounted on said collar portion for rotation relative thereto adjacent said driving member.

2. The assembly of claim 1 wherein said limit means comprises at least one stop affixed to said driving member, said first shaft having at least one drive lug projecting outwardly therefrom to be engageable with said at least one stop to limit the rotation of said first shaft relative to said driving member and cause said driving member to rotate therewith.

3. The assembly of claim 2 wherein said limit means includes a pair of stops positioned on diametrically opposing sides of said first shaft, said first shaft including a pair of drive lugs projecting outwardly therefrom for engagement with said stops, said first shaft being free to rotate relative to said driving member to the extent permitted by said lugs engaging said stops.

4. The assembly of claim 3 wherein said first shaft includes a universal joint having a yoke, said yoke being rotatably mounted on said collar portion of said second shaft.

5. The assembly of claim 4 wherein said yoke is retained on said collar portion of said second shaft by a retainer fixed to said second shaft by a cap screw threaded into said collar portion.

6. The assembly of claim 5 wherein said first shaft is connectable to a primary source of rotational power, the rotation of said first shaft relative to said driving member facilitating the connection of said first shaft to said primary source of power.

7. The assembly of claim 6 wherein said driving member includes a pair of spaced apart plates, said driven member being disposed between said plates, said biasing means urging said plates into engagement with said driven member.

8. In a torque limiting power transfer assembly having a first power transfer shaft, a second power transfer shaft and a clutch mechanism interconnecting said first and second power transfer shafts to limit the amount of power transferred therebetween, the improvement comprising:

said first power transfer shaft being rotatably connected to said clutch mechanism for relative rotational movement therebetween; and limit means affixed to said clutch mechanism to limit the rotational movement of said first power transfer shaft relative to said clutch mechanism such that said first power transfer shaft is free to rotate a limited extent relative to said clutch mechanism, said first power transfer shaft being operable to rotate said clutch mechanism after said limit means has been engaged thereby, said second shaft including a collar portion projecting beyond said clutch mechanism, said first shaft being mounted on said collar portion for rotation relative thereto.

9. The assembly of claim 8 wherein said clutch mechanism includes a driving member connected to said first power transfer shaft, a driven member connected to said second power transfer shaft and a biasing mechanism urging said driving and driven members into operative engagement to transfer rotational power therebetween.

10. The assembly of claim 9 wherein said limit means includes a pair of stops positioned on diametrically opposing sides of said first shaft, said first shaft including a pair of drive lugs projecting outwardly therefrom for engagement with said stops, said first shaft being free to rotate relative to said driving member to the extent permitted by said lugs engaging said stops.

11. The assembly of claim 10 wherein said first shaft includes a universal joint having a yoke, said yoke being rotatably mounted on said collar portion of said second shaft.

12. The assembly of claim 11 wherein said first power transfer shaft is in connectable to a primary source of rotational power, said first shaft being rotatable approximately 90° relative to said driving member to facilitate the connection of said first shaft to said primary source of rotational power.

13. The assembly of claim 12 wherein said driving member includes a pair of spaced apart plates, said driven member being disposed between said plates, said biasing means urging said plates into engagement with said driven member.

14. The assembly of claim 13 wherein said yoke is retained on said collar portion of said second shaft by a retainer fixed to said second shaft by a cap screw threaded into said collar portion.

* * * * *